(12) United States Patent
Yamashita et al.

(10) Patent No.: US 8,427,564 B2
(45) Date of Patent: Apr. 23, 2013

(54) DRIVING METHOD FOR SOLID-STATE IMAGING APPARATUS, AND IMAGE SYSTEM

(75) Inventors: Yuichiro Yamashita, Ebina (JP); Yusuke Onuki, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 248 days.

(21) Appl. No.: 12/866,807

(22) PCT Filed: Mar. 13, 2009

(86) PCT No.: PCT/JP2009/055544
§ 371 (c)(1),
(2), (4) Date: Aug. 9, 2010

(87) PCT Pub. No.: WO2009/122929
PCT Pub. Date: Oct. 8, 2009

(65) Prior Publication Data
US 2011/0025896 A1  Feb. 3, 2011

(30) Foreign Application Priority Data
Mar. 31, 2008 (JP) .................................. 2008-091554

(51) Int. Cl.
*H04N 3/14* (2006.01)
(52) U.S. Cl.
USPC .......................................... 348/294; 348/296
(58) Field of Classification Search .......................... None
See application file for complete search history.

(56) References Cited

U.S. PATENT DOCUMENTS 7,623,056 B2   11/2009   Yamashita ..................... 348/163
7,633,539 B2   12/2009   Yamashita ..................... 348/294
(Continued)

FOREIGN PATENT DOCUMENTS

JP   2004-111590 A   4/2004
JP   2006-246450 A   9/2006
(Continued)

OTHER PUBLICATIONS

State Intellectual Property Office of the People's Republic of China, Office Action in connection with Application No. 200980110922.5, dated Apr. 24, 2012 (3 pages).

*Primary Examiner* — Chieh M Fan
*Assistant Examiner* — Angel L Garces-Rivera
(74) *Attorney, Agent, or Firm* — Fitzpatrick, Cella, Harper & Scinto

(57) ABSTRACT

A driving method of a solid-state imaging apparatus includes a first driving mode wherein a start and an end of an operation of accumulating an electric charge in a pixel are set commonly to a plurality of rows of pixels, and a second driving mode wherein a start and an end of an operation of accumulating the electric charge in the pixel are set commonly to pixels in each one of the rows of the pixels. In the first driving mode, during a time period of reading out a signal from the pixels in one of the rows, a potential barrier formed in a first transferring portion is higher than a potential barrier formed in a third transferring portion for the plurality of rows of the pixels, while in the second driving mode, during a time period of reading out a signal from the pixels in one of the rows, a potential barrier formed in the first transferring portion is lower than a potential of a photoelectric converting portion, and a potential barrier formed in a second transferring portion is lower than a potential of an accumulating portion.

13 Claims, 13 Drawing Sheets

U.S. PATENT DOCUMENTS

| | | |
|---|---|---|
| 7,777,796 B2 | 8/2010 | Inoue et al. |
| 7,817,199 B2 | 10/2010 | Yamashita et al. ............ 348/308 |
| 2004/0051801 A1 | 3/2004 | Iizuka et al. ................. 348/294 |
| 2006/0012697 A1 | 1/2006 | Boemler ...................... 348/296 |
| 2008/0002043 A1 | 1/2008 | Inoue et al. |
| 2008/0018764 A1 | 1/2008 | Mizoguchi ................... 348/308 |
| 2009/0244328 A1 | 10/2009 | Yamashita ................... 348/241 |
| 2009/0256176 A1 | 10/2009 | Kobayashi et al. ........... 257/225 |
| 2009/0284632 A1 | 11/2009 | Onuki et al. ................. 348/302 |
| 2010/0053398 A1 | 3/2010 | Yamashita ................... 348/302 |
| 2010/0165167 A1 | 7/2010 | Sugiyama et al. ............ 348/311 |
| 2010/0283879 A1 | 11/2010 | Inoue et al. |

FOREIGN PATENT DOCUMENTS

| | | | |
|---|---|---|---|
| JP | 2006246450 A | * | 9/2006 |
| JP | 2008-011298 A | | 1/2008 |
| WO | WO 2008/027193 A2 | | 3/2008 |

* cited by examiner

FIG. 3A
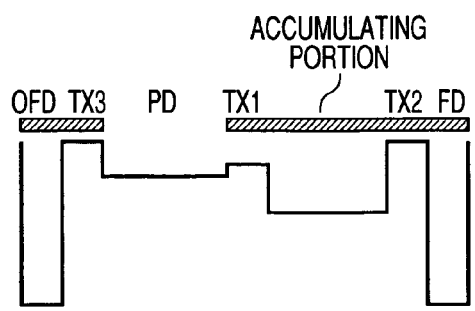
FIG. 3F
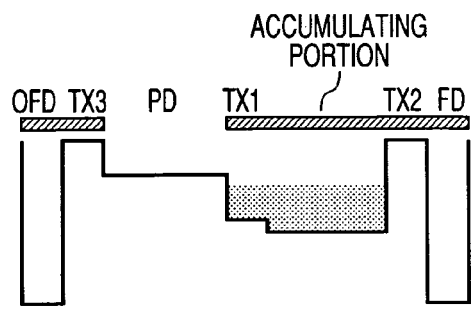
FIG. 3B
FIG. 3G
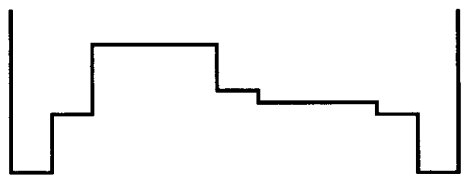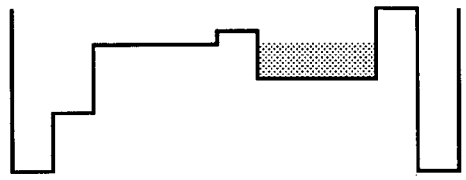
FIG. 3C
FIG. 3H
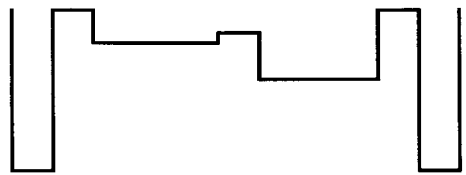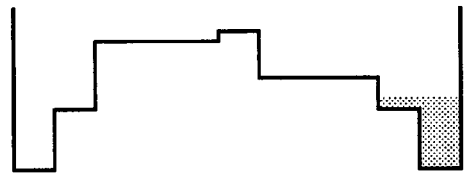
FIG. 3D
FIG. 3I
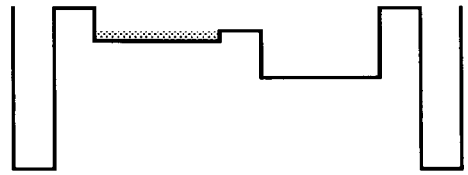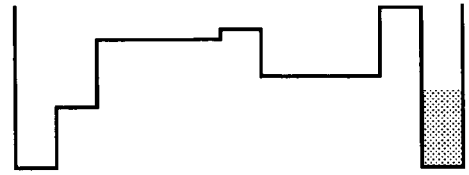
FIG. 3E
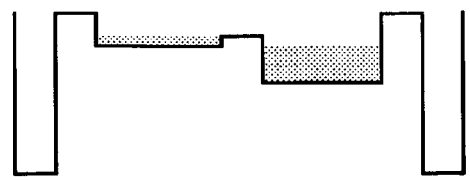

DRIVING METHOD FOR SOLID-STATE IMAGING APPARATUS, AND IMAGE SYSTEM

TECHNICAL FIELD

The present invention relates to a solid-state imaging apparatus used for a scanner, a video camera, and a digital still camera, an imaging system including the solid-state imaging apparatus, and a driving method for the solid-state imaging apparatus.

BACKGROUND ART

There has been generally known a conventional imaging apparatus having a structure in which a photoelectric conversion element for photoelectrically converting incident light also serves as an accumulating portion for accumulating electric charges.

On the other hand, Japanese Patent Application Laid-Open No. 2006-246450 discloses a technique of transferring electric charges generated in the photoelectric conversion element to a charge accumulating region without accumulating the electric charges in the photoelectric conversion element in a structure in which a charge accumulating portion is provided separate from the photoelectric conversion element. FIGS. 12A to 12G correspond to FIG. 6 cited from Japanese Patent Application Laid-Open No. 2006-246450. A MOS transistor is used in which a transferring portion between the photoelectric conversion element and the charge accumulating portion has a buried channel structure. According to Japanese Patent Application Laid-Open No. 2006-246450, the photoelectric conversion element can be maintained at a minimum size required to receive light. Therefore, it is possible to realize an in-plane synchronized electronic shutter in which charge accumulation start times and charge accumulation end times of all in plane pixels are matched.

However, according to Japanese Patent Application Laid-Open No. 2006-246450, electric charges generated in the photoelectric conversion element at a timing of FIG. 12E and subsequent timings are discharged into an overflow drain (hereinafter referred to as OFD), and hence studies for using the electric charges that have overflown to the OFD as signals were not sufficiently made. In general, when a plurality of images are to be successively obtained as in a case of taking a moving image, electric charges generated in the photoelectric conversion element during a time period for which signals corresponding to one image (frame) are read out from the accumulating portion are also required to be used for a signal for forming an image. In the technology disclosed in Japanese Patent Application Laid-Open No. 2006-246450, the signals generated during the time period are discharged into a power source. Therefore, sensitivity may become insufficient or no smooth moving image may be obtained.

On the other hand, when a still image is to be taken, it is required to match charge accumulation start timings and charge accumulation end timings of all pixels for outputting signals for forming an image.

DISCLOSURE OF THE INVENTION

According to a first aspect of the present invention, a driving method for a solid-state imaging apparatus comprising a pixel portion having a plurality of pixels, each of the plurality of pixels comprising: a photoelectric converting portion for photoelectrically converting incident light; a first transferring portion for connecting the photoelectric converting portion to an accumulating portion for accumulating an electric charge; a second transferring portion for connecting the accumulating portion to a floating diffusion portion; a reset portion for connecting the floating diffusion portion to a first power source; and a third transferring portion for connecting the photoelectric converting portion to a second power source, a potential barrier formed in the first transferring portion with respect to the electric charge accumulated in the accumulating portion being lower than a potential barrier formed in the third transferring portion at least during a time period for which each of the plurality of pixels accumulates an electric charge, the driving method comprising: performing a first driving mode in which a start and an end of an operation of accumulating the electric charge in each of the plurality of pixels are set common for the plurality of pixels; and performing a second driving mode in which the start and the end of the operation of accumulating the electric charge in each of the plurality of pixels are set common for the pixels in each row.

According to a second aspect of the present invention, an imaging system comprising: a solid-state imaging apparatus comprising a pixel portion having a plurality of pixels, each of the plurality of pixels comprising: a photoelectric converting portion for photoelectrically converting incident light; a first transferring portion for connecting the photoelectric converting portion to an accumulating portion for accumulating an electric charge; a second transferring portion for connecting the accumulating portion to a floating diffusion portion; a reset portion for connecting the floating diffusion portion to a first power source; and a third transferring portion for connecting the photoelectric converting portion to a second power source, a potential barrier formed in the first transferring portion with respect to the electric charge accumulated in the accumulating portion being lower than a potential barrier formed in the third transferring portion at least during a time period for which each of the pixels accumulates an electric charge; and a control portion for outputting a control signal for driving the solid-state imaging apparatus, wherein the control portion comprises: a first driving mode in which a start and an end of an operation of accumulating the electric charge in each of the plurality of pixels are set common for the plurality of pixels; and a second driving mode in which the start and the end of the operation of accumulating the electric charge in each of the plurality of pixels are set common for the pixels in each row.

According to the present invention, an in-plane synchronized electronic shutter can be realized, and an electric charge generated in the photoelectric conversion element during a time period for which a signal is being read out from the accumulating portion, for example, in a case where a moving image is to be taken, can be used.

Further features of the present invention will become apparent from the following description of exemplary embodiments with reference to the attached drawings.

BRIEF DESCRIPTION OF THE DRAWINGS

FIGS. 3A, 3B, 3C, 3D, 3E, 3F, 3G, 3H and 3I are diagrams illustrating potential states of a pixel during an in plane synchronized electronic shutter operation.

BEST MODE FOR CARRYING OUT THE INVENTION (First Embodiment)

Figure 1:
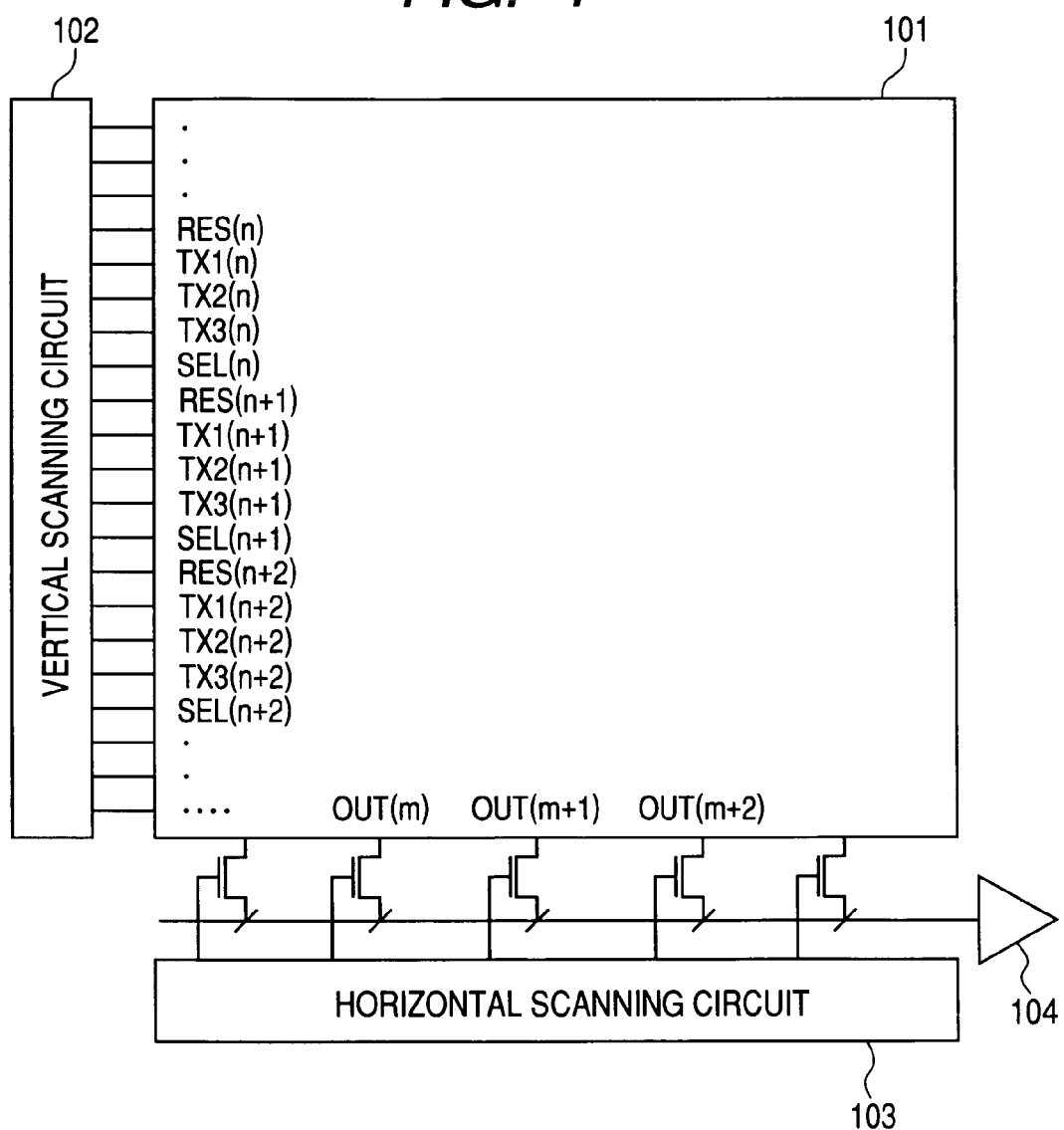
FIG. 1 is a schematic structural diagram illustrating a solid-state imaging apparatus.

A first embodiment of the present invention is described. FIG. 1 is a schematic block diagram illustrating a solid-state imaging apparatus. The solid-state imaging apparatus includes an imaging region 101 in which a plurality of pixels are arranged in rows, a vertical scanning circuit 102, and a horizontal scanning circuit 103. The horizontal scanning circuit 103 successively scans signal lines provided corresponding to columns of the pixels of the imaging region to cause an output circuit 104 to output signals from pixels corresponding to one of the rows.

Figure 2:
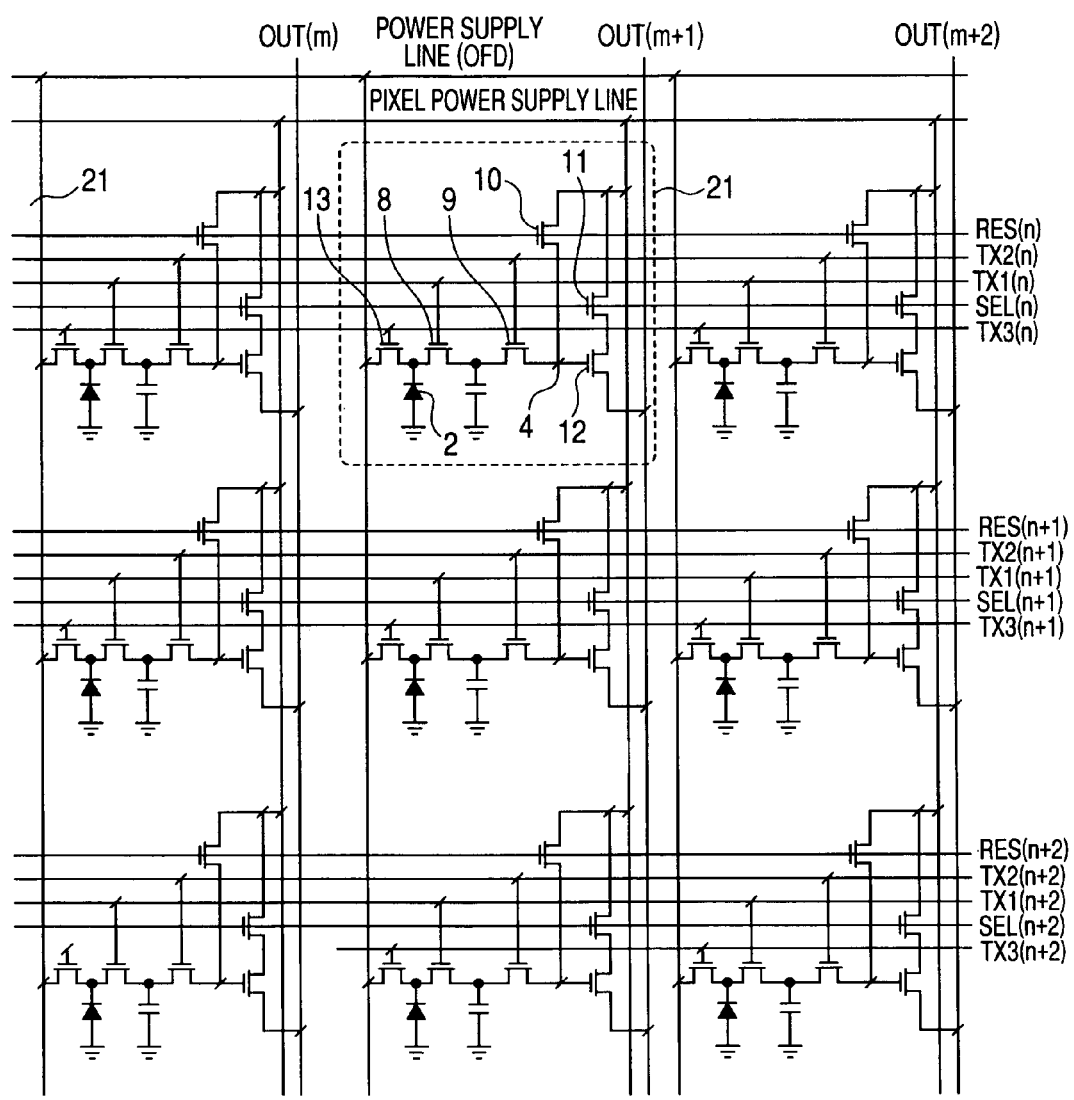
FIG. 2 is an equivalent circuit diagram illustrating pixels.

FIG. 2 is an equivalent circuit diagram illustrating the pixels included in the imaging region 101. To simplify the description, the total number of pixels included in the imaging region 101 is nine (three rows×three columns) in this embodiment. The number of pixels is not limited to this. An anode of a photo diode (PD) 2 which is a photoelectric conversion element is grounded at a fixed potential, and a cathode thereof is connected to one of terminals of an accumulating portion MEM through a first transferring switch 8 which is a first transferring portion. In addition, the cathode is connected to a power supply line which is a second power source serving as an overflow drain (hereinafter referred to as OFD) through a third transferring switch 13 which is a third transferring portion. The other terminal of the accumulating portion MEM is grounded at the fixed potential. The one terminal of the accumulating portion MEM is connected to a gate terminal of an amplifying transistor 12 through a second transferring switch 9 which is a second transferring portion. The gate terminal of the amplifying transistor 12 is connected to a pixel power supply line through a reset transistor 10 which is a reset portion. In this embodiment, each of the first transferring portion, the second transferring portion, and the third transferring portion includes the transistor. In FIG. 2, the power supply line serving as the OFD and the pixel power supply line are separated from each other. However, the power supply line serving as the OFD and the pixel power supply line may be connected to a common power source or different power sources.

A selecting transistor 11 has a drain terminal (one main electrode) connected to the pixel power supply line and a source terminal (the other main electrode) connected to a drain (one main electrode) of the amplifying transistor 12. When an active signal SEL is input, both of the main electrodes of the selecting transistor 11 are connected to each other. Therefore, the amplifying transistor 12 forms a source follower circuit together with a constant current source (not shown) provided for a vertical signal line OUT, whereby a signal corresponding to a potential of the gate terminal (control electrode) of the amplifying transistor 12 is generated on the vertical signal line OUT. A signal is output from the solid-state imaging apparatus based on the signal generated on the vertical signal line OUT, and displayed as an image through, for example, a signal processing circuit unit described later. A node 4 which is a floating diffusion portion (hereinafter referred to as FD) connected in common to the gate terminal of the amplifying transistor 12, a main electrode of the reset transistor 10, and a main electrode of the second transferring switch 9 has a capacitance value and thus can hold electric charges.

Figure 13:
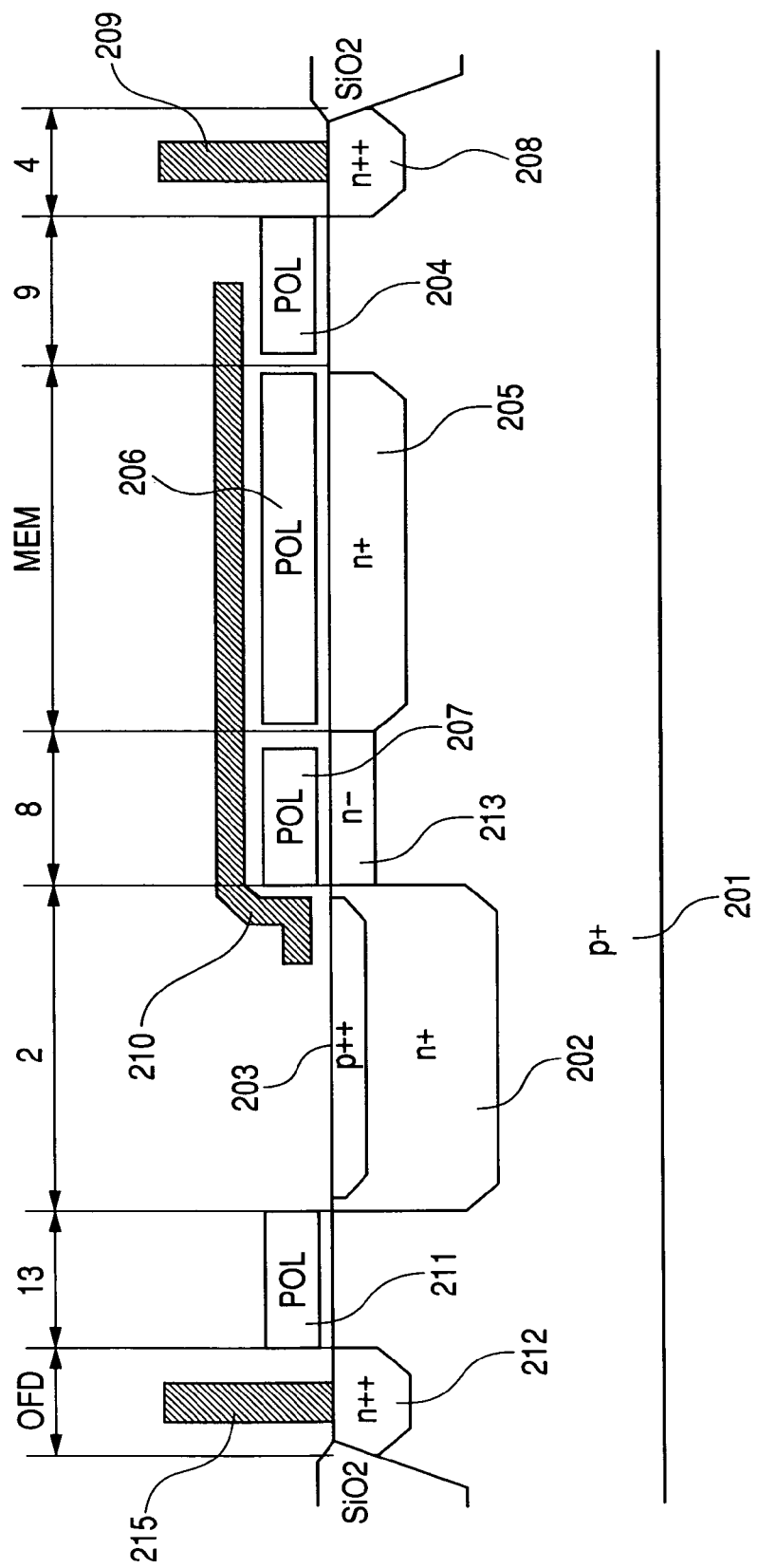
FIG. 13 is a cross sectional view illustrating the pixel of FIG. 2.

FIG. 13 is a cross sectional view illustrating an example in which the pixel of FIG. 2 is formed on a semiconductor substrate. Constituent portions corresponding to the respective constituent portions illustrated in FIG. 2 are denoted by the same reference numerals and symbols. Hereinafter, an example in which, a conductivity type of each semiconductor region is formed so that an electron is used as a signal charge is described. When a hole is used as the signal charge, the conductivity type of each semiconductor region only needs to be inverted.

A P-type semiconductor region 201 can be formed by implanting P-type impurity ions into an N-type semiconductor substrate or may be a P-type semiconductor substrate.

An N-type semiconductor region 202 (first semiconductor region of first conductivity type) serves as a part of a photoelectric converting portion and has the same polarity as the electron which is the signal charge. The N-type semiconductor region 202 forms a PN junction together with a part of the P-type semiconductor region 201 (second semiconductor region of second conductivity type).

A P-type semiconductor region 203 is provided in a surface of the N-type semiconductor region 202 in order to serve the photoelectric converting portion as a buried photo diode, thereby reducing the influence of an interface state and suppressing a dark current from being generated on a surface of the photoelectric converting portion. The photoelectric converting portion includes at least the first semiconductor region and the second semiconductor region forming the PN junction together with the first semiconductor region.

A second transferring electrode 204 is included in the second transferring switch 9. A potential state between a charge accumulating portion and a charge-voltage converting portion (fourth semiconductor region described later) can be controlled according to a voltage supplied to the second transferring electrode. The second transferring electrode is provided, through an insulating film, on a second path between a third semiconductor region described later and the fourth semiconductor region.

An N-type semiconductor region 205 (third semiconductor region of first conductivity type) serves as a part of the accumulating portion and can accumulate, for a predetermined time period, electric charges transferred from the photoelectric converting portion. A control electrode 206 is provided on the third semiconductor region through an insulating film to be able to control a potential state of a part in the vicinity of an interface with the insulating film, of the third semiconductor region. When a voltage is supplied to the control electrode 206 during a time period for which the electric charges are held in the accumulating portion, the influence of a dark current generated in the vicinity of an interface with a surface oxide film of the N-type semiconductor region 205 can be reduced. As will be described later, in this case, the supplied voltage is desirably a negative voltage because it is necessary to collect holes at the interface between the third semiconductor region and the insulating film. For example, a voltage of approximately −3 V is supplied. An appropriate adjustment of the supplied voltage is made corresponding to an impurity concentration of the third semiconductor region.

The accumulating portion MEM includes the N-type semiconductor region 205 and the control electrode 206.

A first transferring electrode 207 is included in the first transferring switch 8 and provided to be able to control a potential state of a first path between the photoelectric converting portion and the charge accumulating portion. A semiconductor region 213, which is lower in concentration than the N-type semiconductor region 202, is provided under the first transferring electrode 207 and between the N-type semiconductor region 202 and the N-type semiconductor region 205. When such a buried channel structure is employed, a potential relationship as illustrated in FIGS. 3A to 3I can be provided.

A floating diffusion region (FD region) (fourth semiconductor region) 208 serves as the charge voltage converting portion and is electrically connected to a gate of an amplifying MOS transistor through a plug 209.

A light shielding film 210 is provided so as to prevent incident light from entering the charge accumulating portion. It is necessary for the light shielding film 210 to cover at least the accumulating portion MEM. As illustrated in FIG. 13, the light shielding layer 210 desirably extends over an entire surface of the first transferring electrode 207 and a part of the second transferring electrode 204 so that the light shielding function is further improved.

A control electrode 211 for electric charge discharge is included in the third transferring switch 13 and provided to be able to control a potential state of a third path between the photoelectric converting portion and an OFD region. The control electrode for electric charge discharge is provided on the third path through an insulating layer. The control electrode for electric charge discharge is used to control the potential state so that electric charges generated in the photoelectric converting portion by incident light can be discharged into the OFD. A length of an accumulating time period (exposure time period) of the photoelectric converting portion can be controlled according to a voltage supplied to the control electrode 211.

A portion 212 (fifth semiconductor region) is included in the OFD. A plug 215 for supplying a power supply voltage to the portion 212 is connected to a power source (not shown). In other words, the portion 212 and the plug 215 serve as the second power source.

The first transferring switch 8 forms a transistor together with the photoelectric converting portion and the accumulating portion. The second transferring switch 9 forms a transistor together with the accumulating portion and the floating diffusion portion 4. The third transferring switch 13 forms a transistor together with the photoelectric converting portion and the second power source.

A plurality of unit pixels illustrated in FIG. 2 and FIG. 13 are desirably two-dimensionally arranged to serve as the solid-state imaging apparatus. In the pixels, a plurality of the photoelectric converting portions can share the reset portion, an amplifying portion, and a selecting portion.

Hereinafter, a driving method for realizing an in-plane synchronized electronic shutter is described, and then a driving method for realizing a rolling electronic shutter is described.

Potentials of the respective portions of a pixel in the in-plane synchronized electronic shutter and an input signal are described with reference to FIGS. 3A to 3I and 4. In FIGS. 3A to 3I, black bands located over regions except for the photo diode (PD) schematically exhibit light shielding members. Specifically, the light shielding members are realized using wirings provided on the semiconductor substrate, and light is incident only on the photo diode. FIG. 3A illustrates potentials in a case where no active signal is input to each of the control electrode of the first transferring switch 8, the control electrode of the second transferring switch 9, the control electrode of the third transferring switch 13, and the control electrode of the reset transistor 10. It is assumed that the photo diode 2, the accumulating portion MEM, and the FD 4 do not hold electric charges at that time. In this embodiment, electric charges which are generated in the photo diode 2 to be accumulated in the accumulating portion MEM is an electron, and hence a potential increases with a shift to a lower side of each of FIGS. 3A to 3I. In FIGS. 3A to 3I, a potential state of the channel of the first transferring switch, a potential state of the channel of the second transferring switch, and a potential state of the channel of the third transferring switch are expressed by TX1, TX2, and TX3, respectively. Signals TX1(n) to TX1(n+2), TX2(n) to TX2(n+2), and TX3(n) to TX3(n+2) illustrated in FIG. 2 are supplied to the first transferring switch, the second transferring switch, and the third transferring switch, respectively. In this embodiment, during a time period for which electric charges are held in a pixel, potentials of the potential states TX2 and TX3 corresponding to the second and third transferring switches are lower than a potential of the potential state TX1 corresponding to the first transferring switch, and the potential of the potential state TX1 is lower than the potential of the photo diode (PD). In other words, potential barriers formed in the potential states TX2 and TX3, with respect to electrons which are electric charges to be accumulated in the accumulating portion MEM, are higher than a potential barrier formed in the potential state TX1. The potential barrier formed in the potential state TX1 with respect to electrons is in a potential state in which at least a part of electrons generated in the photo diode (PD) is accumulated in the PD. Because of such a potential relationship as described above, when electrons are generated in the photo diode by incident light, a certain amount or more of electrons flow to the charge accumulating portion across the potential barrier of the potential state TX1. That is, the certain amount or more of electrons generated in the photo diode flow into the accumulating portion MEM without being accumulated in the photo diode.

Figure 4:
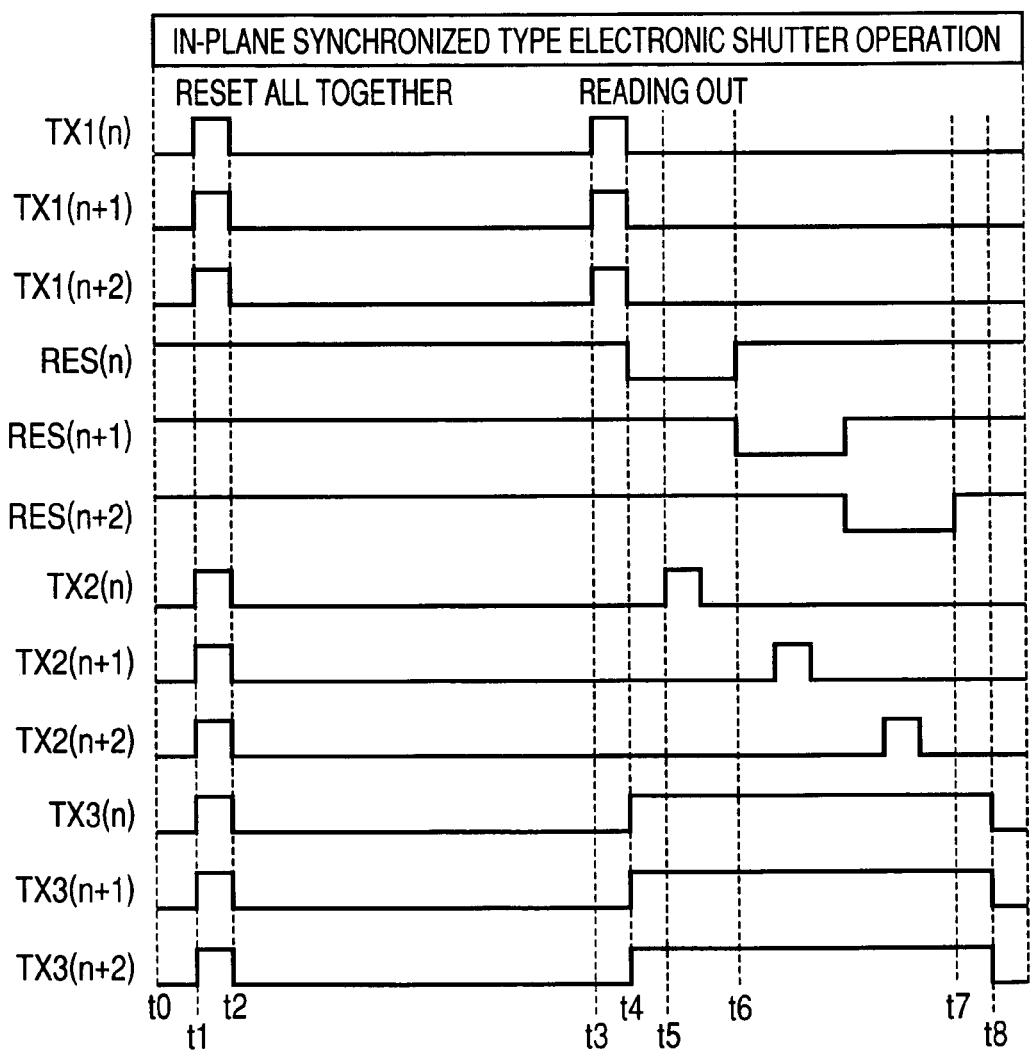
FIG. 4 is a timing chart illustrating the in plane synchronized electronic shutter operation.

FIG. 3A illustrates a state at a time t0 of FIG. 4. The signals TX1(n), TX2(n), and TX3(n) are in a non-active level. Amounts of electric charges held in the photo diode (PD) and the accumulating portion MEM are not taken into account. At this time, signals RES(n), RES(n+1), and RES(n+2) are in an active level, and hence the FD is in a reset state.

At a time t1, the signals TX1(n) to TX1(n+2), TX2(n) to TX2(n+2), and TX3(n) to TX3(n+2) simultaneously become active, whereby a state illustrated in FIG. 3B is obtained. In this state, electric charges generated in the photo diode and electric charges held in the accumulating portion MEM are discharged into the power source or the pixel power supply line through the OFD or the FD.

At a time t2, the signals TX1(n) to TX1(n+2), TX2(n) to TX2(n+2), and TX3(n) to TX3(n+2) simultaneously make a non-active level transition. Then, a charge accumulating operation of each pixel starts. A potential state at this time is illustrated in FIG. 3C.

FIG. 3D illustrates a state in which time elapses from the time t2 and the electric charges are accumulated in the photo diode. A shaded region indicates electric charges generated by photoelectric conversion. In this state, the potential of the photo diode is equal to the potential of the channel of the first transferring portion (transistor), and hence a further amount of electric charges cannot be accumulated in the photo diode. Therefore, electric charges generated in the photo diode after this time flow into the accumulating portion MEM through the first transferring transistor without being accumulated in the photo diode.

FIG. 3E illustrates a potential state of a pixel at a time immediately before a time t3. In this state, the electric charges which cannot be accumulated in the photo diode are held in the accumulating portion.

When the signals TX1(n) to TX1(n+2) which are active are applied to the first transferring transistors at the time t3, a state illustrated in FIG. 3F is obtained. The potential barrier with respect to the electrons which is formed between the photo diode and the accumulating portion is eliminated, and hence the electric charges accumulated in the photo diode are also transferred to the accumulating portion. At a time t4, the signals TX1(n) to TX1(n+2) become non-active, the signals TX3(n) to TX3(n+2) applied to the third transferring transistors become active, and the signal RES(n) becomes non-active. Therefore, a state illustrated in FIG. 3G is obtained. At this time, the potential barrier with respect to the electrons is formed between the photo diode and the accumulating portion MEM, and the potential barrier with respect to the electrons which is formed between the photo diode and the OFD is eliminated. Then, all the electric charges generated in the photo diode flow into the OFD. In other words, even when light is incident on the photo diode, the incident light does not appear as a signal for forming an image, and hence such a state can be assumed to be equal to a light shielded state. Thus, the synchronism of accumulating times within an imaging plane can be ensured.

When the signal TX2(n) becomes active at a time t5 and has a pulse shape, the electric charges accumulated in the accumulating portion MEM of an n-th pixel are transferred to the FD. FIG. 3H illustrates a state in the case where the signal TX2(n) becomes active at the time t5. FIG. 3I illustrates a state in a case where the signal TX2(n) subsequently becomes non-active. When a signal SEL(n) becomes a high level, a signal corresponding to the potential of the FD is output to the vertical signal line, and hence the signal is necessary to be output from the output portion (output circuit) before the signal RES(n) becomes active again at a time t6 or to be stored in a memory (not shown) provided corresponding to the vertical signal line. Before a time t7, the same operation is performed on an (n+1)-th pixel and an (n+2)-th pixel to read out all pixel signals. At a time t8, the signals TX3(n) to TX3(n+2) become non-active, and a series of operations is completed.

Therefore, the in plane synchronized electronic shutter operation can be realized. Thus, the driving method described above is suitable to take a still image by a still camera for which the synchronism of accumulating times within the imaging plane is required.

Next, the driving method for realizing the rolling electronic shutter in the solid-state imaging apparatus including the pixels illustrated in FIG. 2 according to this embodiment is described with reference to FIGS. 5A to 5G and 6.

Figure 5A:
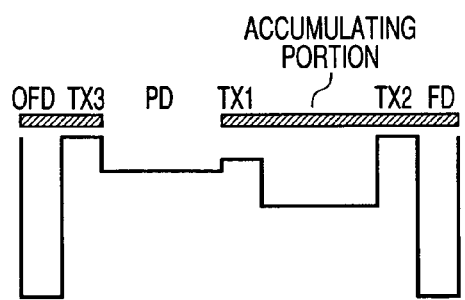
FIGS. 5A, 5B, 5C, 5D, 5E, 5F and 5G are diagrams illustrating potentials of a pixel during a rolling electronic shutter operation according to a first embodiment of the present invention.
Figure 6:
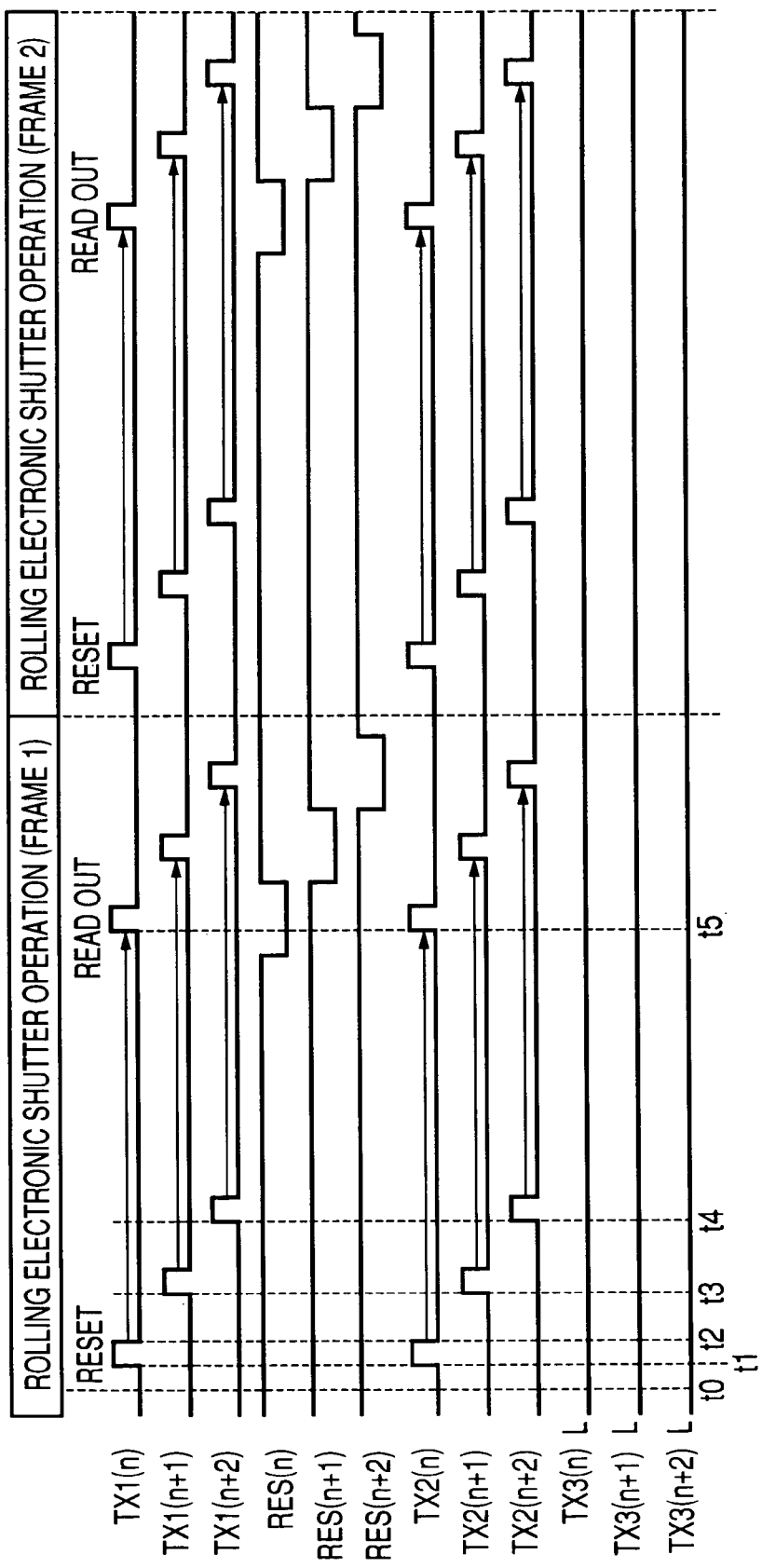
FIG. 6 is a timing chart illustrating the rolling electronic shutter operation according to the first embodiment of the present invention.

FIG. 5A illustrates a potential state of a pixel at a time t0 of FIG. 6, which is the same state as in FIG. 3A. The amounts of electric charges held in the photo diode (PD) and the accumulating portion are not taken into account. At this time, the signals RES(n) to RES(n+2) are in the active level, and hence the FD is in the reset state.

At a time t1, the signals TX1(n) and TX2(n) simultaneously become active, whereby electric charges accumulated in the photo diode and the accumulating portion MEM of an n-th pixel are transferred to the FD. FIG. 5B illustrates a state in which the signals TX1(n) and TX2(n) become active at the time t1. The signal RES(n) is in the high level, and hence the electric charges accumulated in the photo diode and the accumulating portion MEM are discharged into the pixel power supply line. An (n+1)-th pixel and an (n+2)-th pixel are in the same state as in FIG. 5A because no input signal levels change. The photo diode (PD) of each of the pixels is irradiated with incident light, and hence the electric charges may be accumulated in the photo diode (PD) and the accumulating portion of each of the pixels.

Figure 5E:
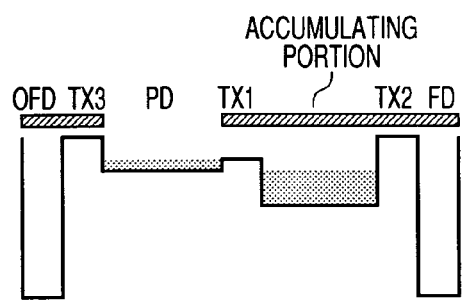
Figure 5B:
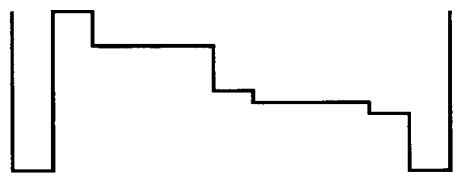
Figure 5F:
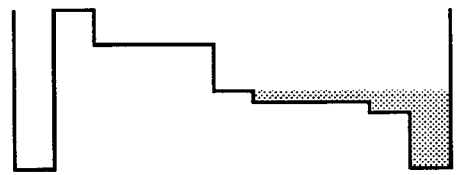
Figure 5C:
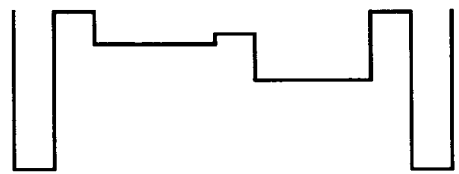

When the signals TX1(n) and TX2(n) make a non-active level transition at a time t2, the n-th pixel is a state illustrated in FIG. 5C, and an accumulating time starts.

At a time t3, the signals TX1(n+1) and TX2(n+1) become a high level in a pulse shape. At a time t4, the signals TX1(n+2) and TX2(n+2) become the high level in the pulse shape. Therefore, accumulating times of the (n+1)-th pixel and the (n+2)-th pixel start.

Figure 5G:
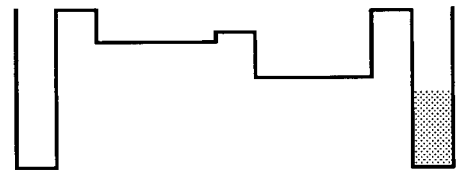
Figure 5D:
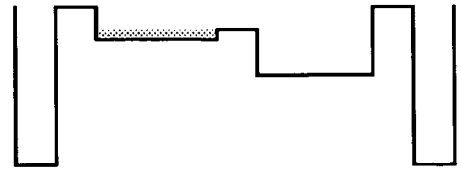

During each of the accumulating times, when the amount of electric charges obtained by conversion by the photo diode exceeds a predetermined amount, a state illustrated in FIG. 5D is obtained, and then the electric charges generated in the photo diode are transferred to the accumulating portion MEM to be accumulated therein as illustrated in FIG. 5E.

Before a time t5, the signal RES(n) becomes non-active, whereby the reset state of the FD is released. When the signal RES(n) is in a non-active level state at the time t5 and the signals TX1(n) and TX2(n) make an active level transition, a state as illustrated in FIG. 5F is obtained. Therefore, the electric charges accumulated in the photo diode and the accumulating portion MEM of the n-th pixel are transferred to the FD.

When the signals TX1 (n) and TX2 (n) become the non-active level at the time t5, a state as illustrated in FIG. 5G is obtained. In this state, when the signal SEL(n) becomes an active level, a signal corresponding to the potential of the FD is output to the vertical signal line, and hence the signal is necessary to be output from the output portion before the signal RES(n) makes an active level transition again or to be stored in a memory (not shown) provided corresponding to the vertical signal line. The same operation is sequentially performed on the (n+1)-th pixel and the (n+2)-th pixel to output signals from all the pixels (three rows×three columns) illustrated in FIG. 2 to the vertical signal line.

The rolling electronic shutter operation is greatly different from the in-plane synchronized electronic shutter operation described earlier, in the point that the operation for transferring the electric charges from the photo diode and the accumulating portion to the FD is sequentially performed row by row. In the case of the in plane synchronized electronic shutter operation, the accumulating time is set common for the pixels in the imaging region. On the other hand, in the case of the rolling electronic shutter operation, the accumulating time is set in each row. According to this driving method, the accumulation start timing and the accumulation end timing vary in each row (row sequential accumulation). The signals TX3(n) to TX3(n+2) are continuously non-active, and hence the electric charges generated in the photo diode are not discharged into the OFD, that is, are not discarded. Therefore, electric charges generated in the photo diode during the time period for which the signal corresponding to the potential of the FD is read out after the time t5 can be used for a signal for forming a next frame. Thus, the driving method is suitable for applications including moving images.

The driving method can be used for even a solid-state imaging apparatus including only a structure in which all the signals TX3(n) to TX3(n+2) can be simultaneously driven, such as a structure in which the OFD is, for example, a vertical overflow drain. Therefore, there is an advantage that a structure of the driving circuits can be simplified.

As described above, there are the two driving methods for the imaging apparatus including the pixel using the buried channel transistor as the first transferring transistor, that is, the operations based on two driving modes. A description on how to switch between the two driving modes will be made with reference to FIGS. 7 and 8.

Figure 7:
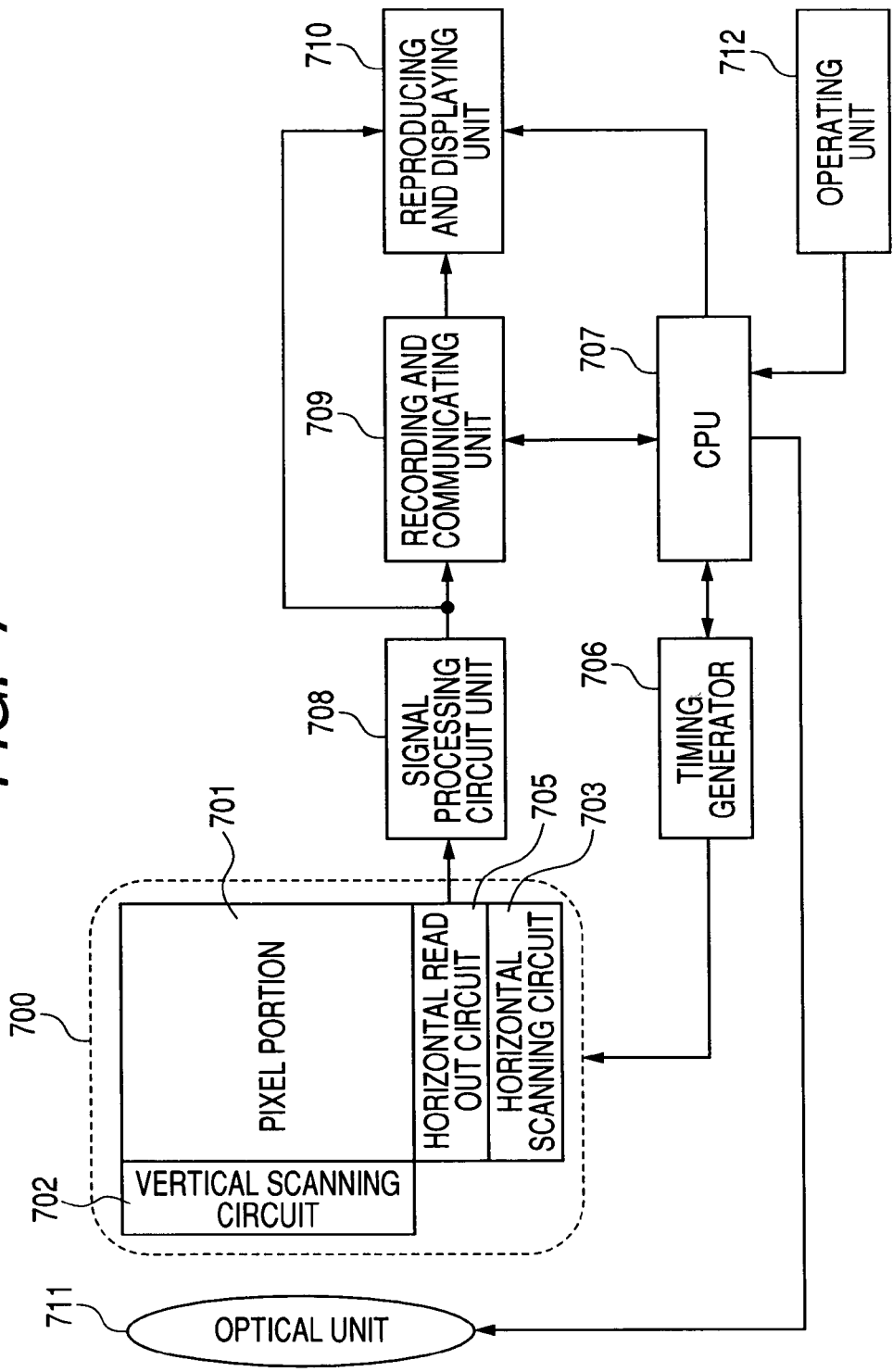
FIG. 7 is a schematic structural diagram illustrating an imaging system.

FIG. 7 illustrates a schematic structure of an imaging system. The imaging system includes, for example, an optical unit 711, a solid-state imaging apparatus 700, a signal processing circuit unit 708, a recording and communicating unit 709, a timing generator 706, a CPU 707, a reproducing and displaying unit 710, and an operating unit 712. The optical unit 711 which is an optical system including a lens images light from a subject on a pixel portion 701 in which a plurality of pixels are two-dimensionally arranged, of the solid-state imaging apparatus 700 to form a subject image. The pixel portion includes an effective pixel region described above. The solid-state imaging apparatus 700 outputs a signal corresponding to the light imaged on the pixel portion 701 at a timing in response to a signal from the timing generator 706.

The solid-state imaging apparatus 700 includes the pixel portion 701 corresponding to the imaging region illustrated in FIG. 1 and a horizontal readout circuit 705 having a holding portion for temporarily holding signals output from the respective pixels of the pixel portion 701 to the vertical signal lines. The horizontal readout circuit 705 may include an output portion corresponding to the output circuit 104 illustrated in FIG. 1. The solid-state imaging apparatus 700 further includes a vertical scanning circuit 702 for selecting rows of the pixels of the pixel portion and a horizontal scanning circuit 703 for controlling the horizontal readout circuit 705 so as to output signals as sensor signal outputs.

The signals output from the solid-state imaging apparatus 700 are input to the signal processing circuit unit 708 which is a signal processing section. The signal processing circuit unit 708 performs processing such as A/D conversion on the input electrical signals based on a method determined according to a program. Signals obtained by processing by the signal processing circuit unit 708 are sent as image data to the recording and communicating unit 709. The recording and communicating unit 709 sends signals for forming an image to the reproducing and displaying unit 710 to cause the reproducing and displaying unit 710 to reproduce and display a moving image or a still image. Upon receiving the signals from the signal processing circuit unit 708, the recording and communicating unit 709 communicates also with the CPU 707 which is a control section and operates to record, on a recording medium (not shown), the signals for forming the image.

The CPU 707 controls the overall operation of the imaging system and outputs control signals for controlling the optical unit 711, the timing generator 706, the recording and communicating unit 709, and the reproducing and displaying unit 710. The CPU 707 includes a storage device (not shown) which is, for example, a recording medium. Programs required to control the operation of the imaging system are recorded in the storage device. The CPU 707 outputs a driving mode instruction signal and an imaging instruction signal to the timing generator 706. The driving mode instruction signal and the imaging instruction signal may be not different signals but a single signal.

Upon receiving the driving mode instruction signal and the imaging instruction signal from the CPU, the timing generator 706 supplies signals to the vertical scanning circuit 702 and the horizontal scanning circuit 703 to drive the solid-state imaging apparatus 700 in the driving mode corresponding to the driving mode instruction signal.

For example, the CPU 707 supplies the driving mode instruction signal and the imaging instruction signal to the timing generator 706 to perform imaging in the driving mode for the in plane synchronized electronic shutter operation. Then, the timing generator 706 supplies a signal for performing the in plane synchronized electronic shutter operation to the solid-state imaging apparatus 700. Upon receiving the signal supplied from the timing generator 706, the solid-state imaging apparatus 700 is driven at the timings illustrated in, for example, FIG. 4 to output, to the signal processing circuit unit 708, signals obtained at the same accumulating time within the imaging plane.

Further, for example, the CPU 707 supplies the driving mode instruction signal and the imaging instruction signal to the timing generator 706 to perform imaging in the driving mode for the rolling electronic shutter operation. Then, the timing generator 706 supplies a signal for performing the rolling electronic shutter operation to the solid-state imaging apparatus 700. Upon receiving the signal supplied from the timing generator 706, the solid-state imaging apparatus 700 is driven at the timings illustrated in, for example, FIG. 6 to output, to the signal processing circuit unit 708, signals obtained at the different accumulating times from pixels in each row within the imaging plane.

The operating unit 712 is an interface operated by a user, and outputs, to the CPU 707, an operating signal generated depending on the operation of the user. More specifically, a moving image taking mode and a still image taking mode can be switched therebetween or the shutter timings can be determined.

The reproducing and displaying unit 710 is used to display the input image data as an image. For example, image data recorded on the recording medium (not shown) through the signal processing circuit unit 709 can be displayed as an image. When the driving method is used for an electronic view finder (EVF) described later, image data supplied not from the recording and communicating unit 709 but the signal processing circuit unit 708 can be displayed as an image.

Figure 8:
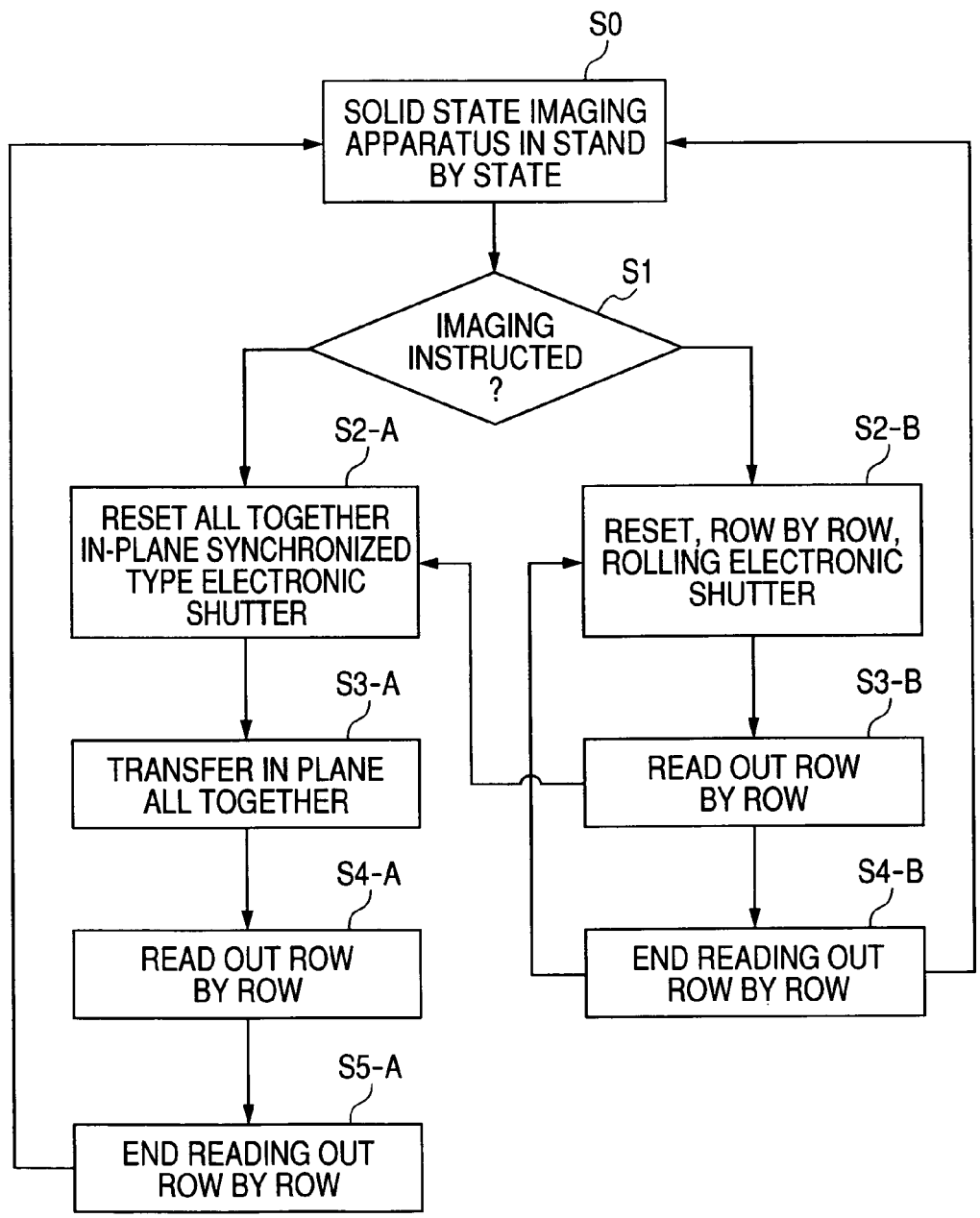
FIG. 8 is a flow chart illustrating an operation of the imaging system.

FIG. 8 is a flow chart illustrating a schematic operation of the imaging system.

In Step S0, the solid-state imaging apparatus 700 is in a standby state.

In Step S1, the operating signal is input from the operating unit 712 to the CPU 707. When the operating signal is a signal corresponding to an instruction for imaging using the in plane synchronized electronic shutter, processing goes to Step S2-A to start a first driving mode for performing the in-plane synchronized electronic shutter operation. On the other hand, when the operating signal is a signal corresponding to an instruction for imaging using the rolling electronic shutter, processing goes to Step S2-B to start a second driving mode for performing the rolling electronic shutter operation.

First, the case where the operating signal is the signal corresponding to the instruction for imaging using the in-plane synchronized electronic shutter is described.

In Step S2-A, in-plane synchronized reset is performed to reset all the pixels together within the imaging plane. This corresponds to the operation during the time t1 and the time t2 of FIG. 4. Then, when the reset of the pixels is completed (time t2 of FIG. 4), the accumulating time periods of the pixels start.

After that, when a certain time elapses, in Step S3-A corresponding to the operation at the time t3 of FIG. 4, all the electric charges accumulated in the photo diodes (PD) of the pixels are transferred together to the accumulating portions MEM.

Subsequent Step S4-A corresponds to the operation between the time t5 and the time t7 of FIG. 4. This time period is a time period for which signals corresponding to the electric charges held in the FD are output to the vertical signal lines in each row of the pixels, that is, the signals are read out.

When the output of the signals from the pixels in each row is completed (Step S5-A), processing returns to Step S0 and the solid-state imaging apparatus 700 becomes the standby state again.

Next, the case where the operating signal is the signal corresponding to the instruction for imaging based on the rolling electronic shutter operation is described.

In Step S2-B, the pixels are reset row by row. This corresponds to the operation during the time t1 and the time t4 (completion of reset operation) of FIG. 6.

In subsequent Step S3-B, the operation starting at the time t5 of FIG. 6 starts to output signals from the pixels in each row to the vertical signal lines.

When the output of the signals from the pixels in each row is completed (Step S4-B), processing returns to Step S0 and the solid-state imaging apparatus 700 becomes the standby state again. As described above, the rolling electronic shutter operation can be suitably used to obtain sequential images such as moving images. When processing goes to Step S2-B after Step S4-B, sequential imaging is expected. Therefore, the operations of Step S2-B to Step S4-B are repeated. For example, when an operating signal for stopping imaging is input to the CPU 707, processing returns to Step S0 after Step S4-B.

There may be a case where the operation is switched to the first driving mode while a moving image is being taken in the second driving mode. FIG. 8 illustrates a case where an operating signal for instructing switching to the first driving mode is input to the CPU 707 during the time period for which the operation of Step S3-B is performed. When the operating signal for instructing the switching of the driving mode is input to the CPU 707 during Step S3-B, processing immediately goes to Step S2-A and all the pixels within the imaging plane are reset together.

On the other hand, as is apparent from the operation of FIG. 4, the signals TX3(n) to TX3(n+2) are in the active level during the time period between the time t4 and the time t8, and hence the electric charges generated in the photo diode (PD) during this time period are not accumulated in the pixels. Therefore, the operation is not switched to the second driving mode during the first driving mode. In particular, in a case where the first driving mode is used to take still images, when the operation is switched to the second driving mode during Step S4-A, a signal corresponding to one frame is not output, and hence the signal obtained at this time cannot be used for an image. In order to prevent such a state as described above, it is necessary to avoid switching from Step 54-A in the first driving mode to the second driving mode.

The respective steps described above are merely examples, and thus the present invention is not limited to such examples described above.

Next, a desirable application example of the first driving mode for performing the in-plane synchronized electronic shutter operation and a desirable application example of the second driving mode for performing the rolling electronic shutter are described.

The first driving mode is suitable to take a still image or to control strobe light because all the pixels within the imaging plane are subjected to the charge accumulating operation together.

On the other hand, the second driving mode is suitable to take a moving image as described above or to perform imaging for EVF display, and can be used for an automatic exposure (AE) operation. The first driving mode or the second driving mode may be used for an automatic focus (AF) operation.

According to the first embodiment of the present invention described above, the in-plane synchronized electronic shutter can be realized, and the rolling electronic shutter can also be realized. Therefore, switching can be performed depending on the intended use.

(Second Embodiment)

In the driving method for performing the rolling electronic shutter operation according to the first embodiment of the present invention, the signals TX3(n) to TX3(n+2) are continuously in the non-active level. In this embodiment, the signals TX3(n) to TX3(n+2) are made active to be pulsed at the same timings as those of the signals TX1(n) to TX1(n+2) and TX2(n) to TX2(n+2) for corresponding rows.

Figure 9:
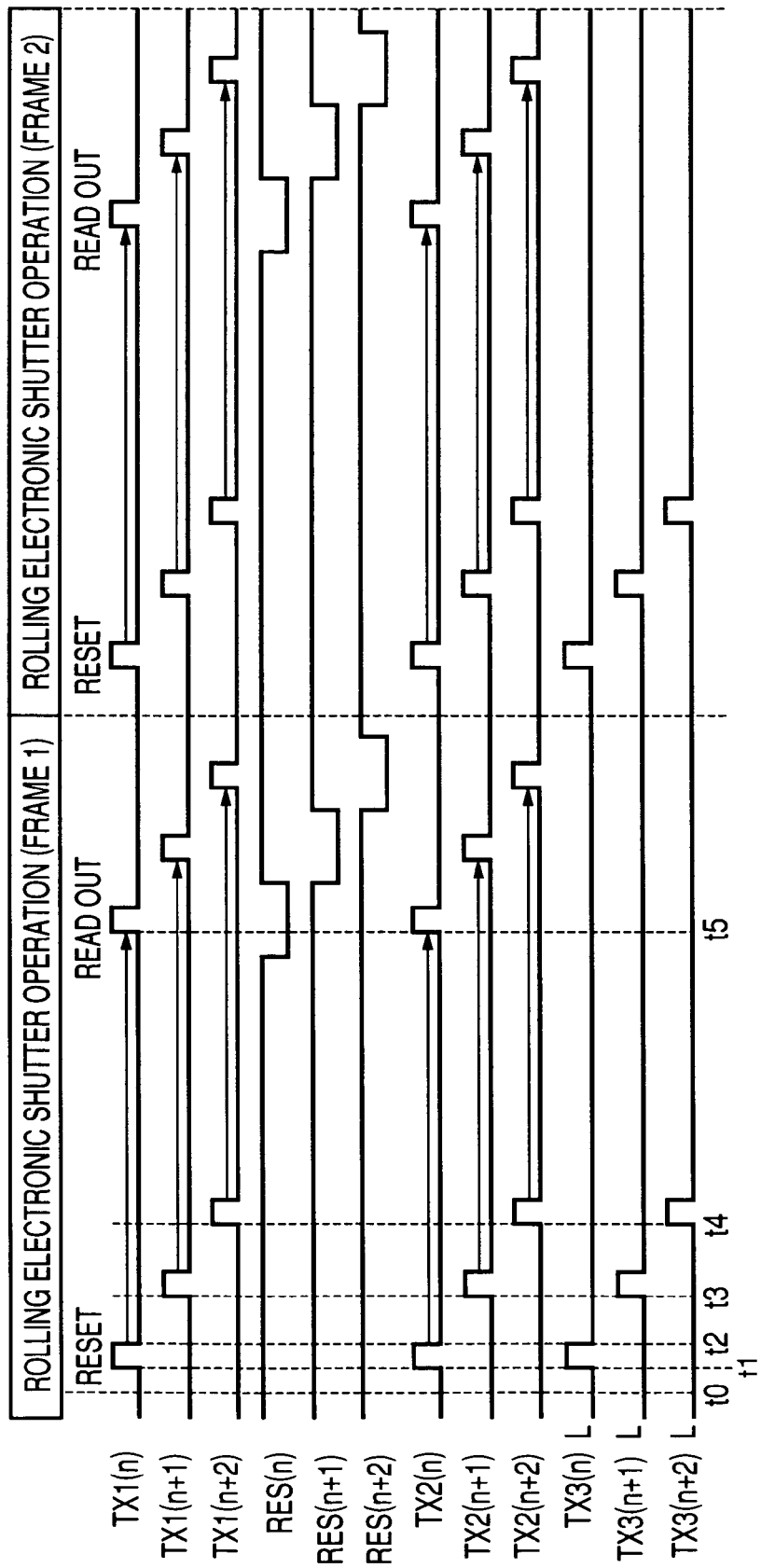
FIG. 9 is a timing chart illustrating a rolling electronic shutter operation according to a second embodiment of the present invention.

FIG. 9 illustrates driving timings according to this embodiment. The driving timings are different from the driving timing illustrated in FIG. 6 in the point that, during the time period between the time t1 and the time t4, the signals TX1 and TX2 become a pulsed active level and the signal TX3 simultaneously becomes the pulsed active level.

When the operation according to this embodiment is performed instead of the operation according to the first embodiment of the present invention as illustrated in FIG. 6, the influence of the electric charges left in the photo diode on an operation during a next time period can be suppressed.

In the driving method according to this embodiment, the electric charges generated in the photo diode are discharged through the overflow drain (OFD), and hence the electric charges are discharged in the same procedure as the discharging method for the in-plane synchronized electronic shutter operation. Therefore, image qualities in both of the driving modes are equal to each other. Thus, for example, even when a still image is obtained by the operation illustrated in FIG. 4 during a moving image is being taken by the operation illustrated in FIG. 9, there is an effect that the unnatural appearance of the obtained image is prevented.

(Others)

In each of the embodiments described above, the first transferring portion which is the first transferring switch including the transistor and driven with the signal input to the gate thereof has been described. Therefore, the electric charges accumulated in the photoelectric conversion element during the accumulating time period are transferred to the floating diffusion portion (FD) and thus can be used for a signal. However, there may be a case where the potential of the first transferring portion is not controlled to be active. In this case, the electric charges accumulated in the photoelectric conversion element during the accumulating time period are not used for the signal. For example, when a subject with low illuminance is to be imaged, the signal is not obtained. Thus, in a case where the influence of the amount of electric charges accumulated in the photoelectric conversion element is not great, such as a case where a subject with sufficient illuminance is to be imaged, it may be unnecessary to make the potential state of the first transferring portion active.

Figure 10:
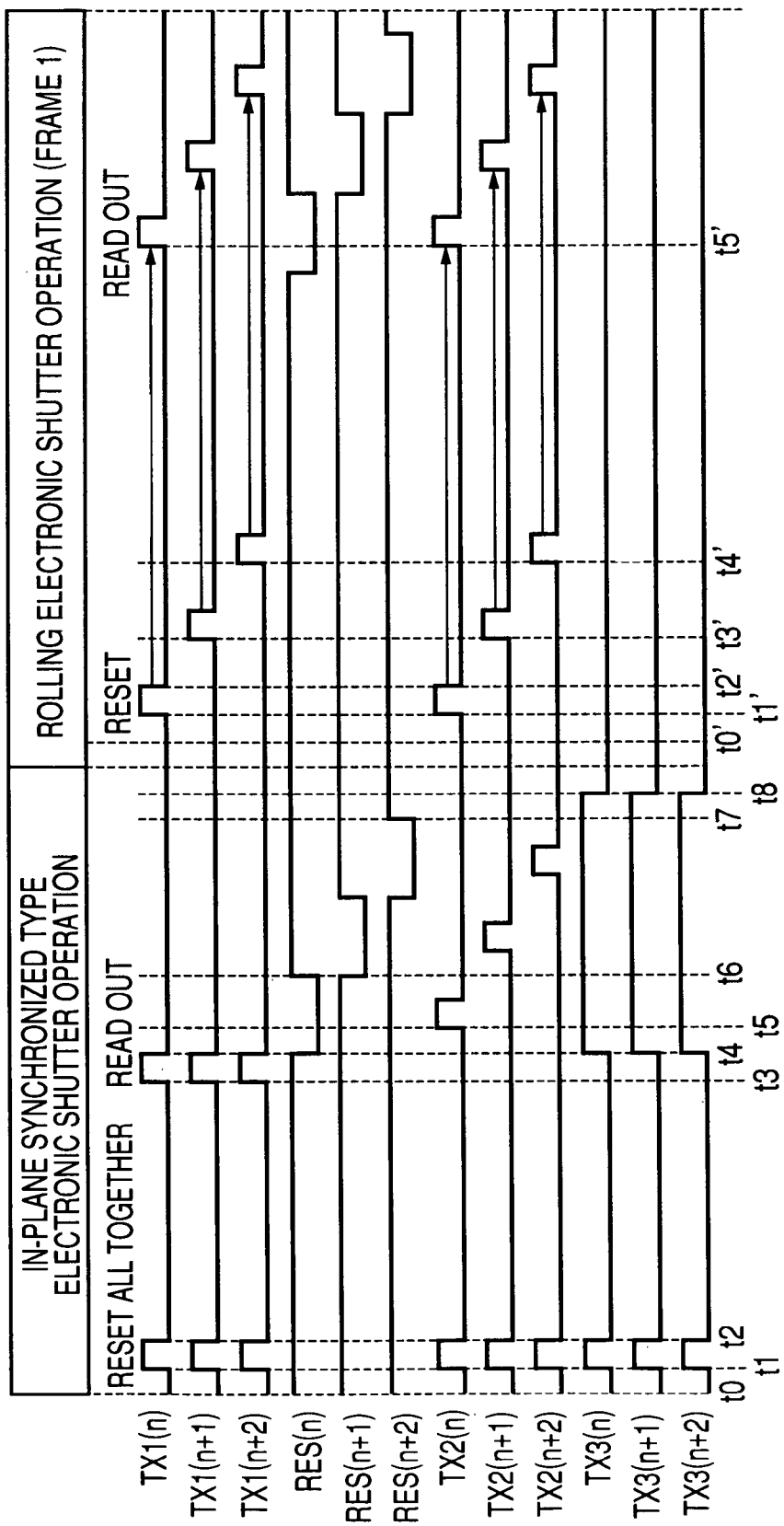
FIG. 10 is a timing chart illustrating driving mode switching.

FIG. 10 is a timing chart illustrating a case where the operation according to the first driving mode and the operation according to the second driving mode are successively performed. The operations according to the respective driving modes are equal to the operations illustrated in FIGS. 4 and 6.

Figure 11:
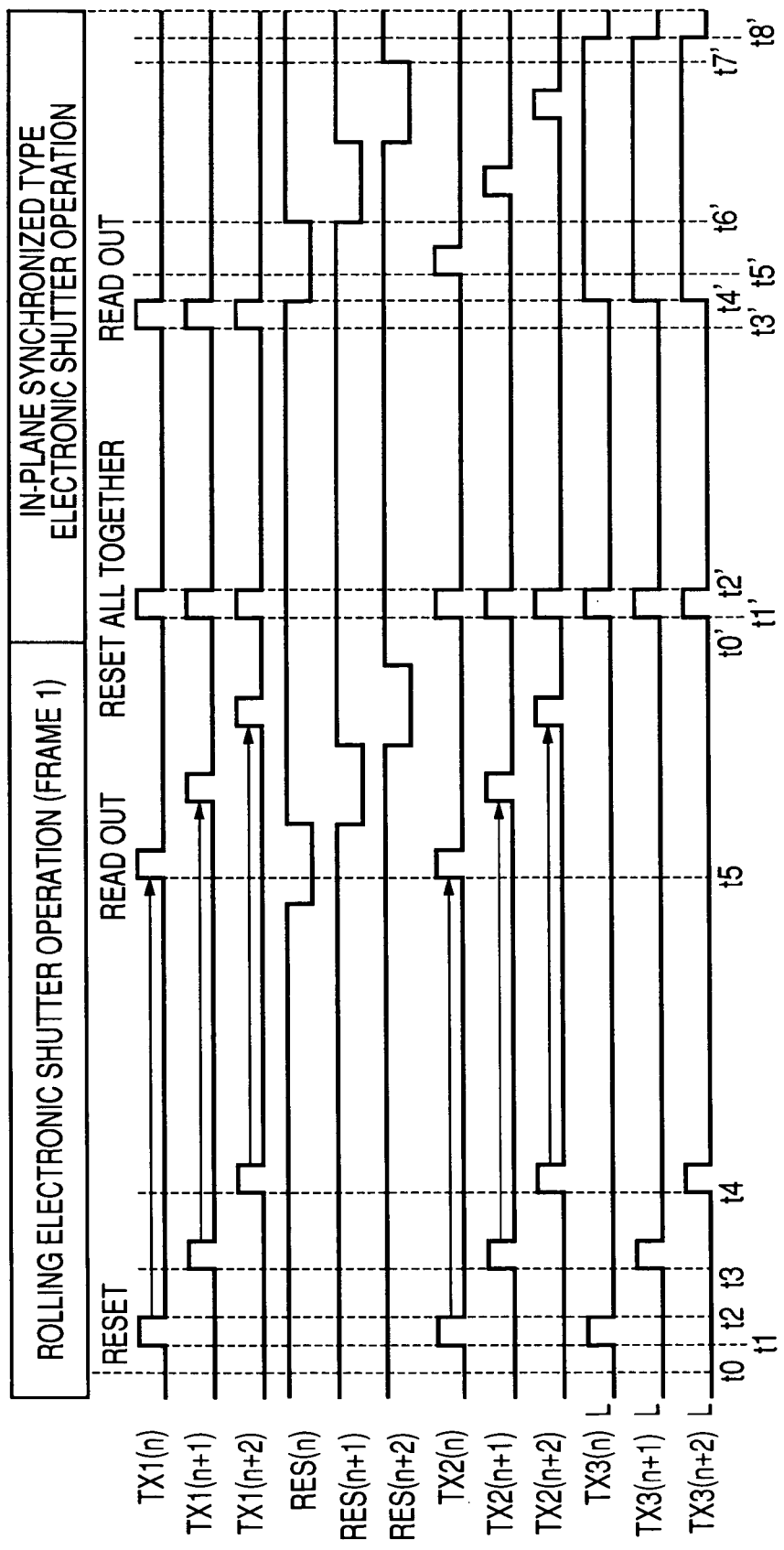
FIG. 11 is a timing chart illustrating another driving mode switching.
Figure 12A:
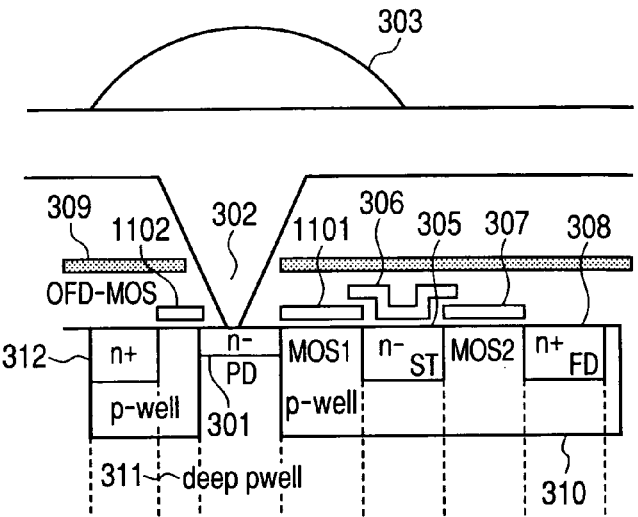
FIGS. 12A, 12B, 12C, 12D, 12E, 12F and 12G are diagrams corresponding to FIG. 6 cited from Japanese Patent Application Laid-Open No. 2006-246450.
Figure 12B:
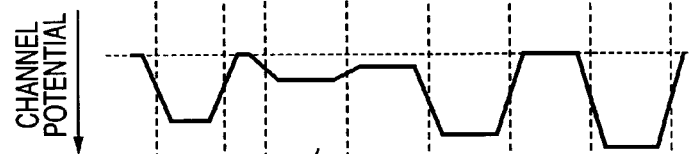
Figure 12C:
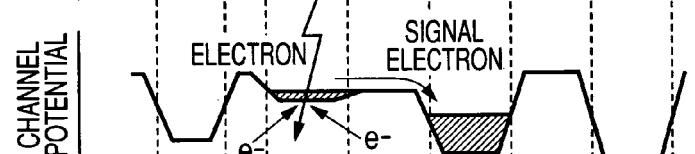
Figure 12D:
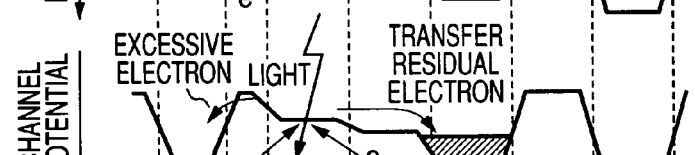
Figure 12E:
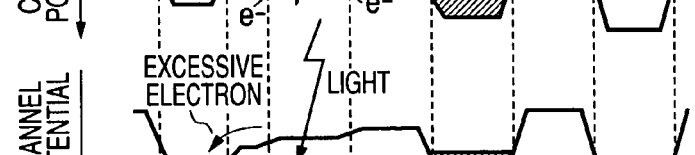
Figure 12F:
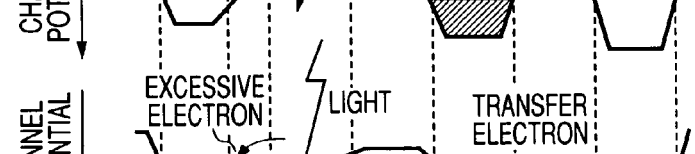
Figure 12G:
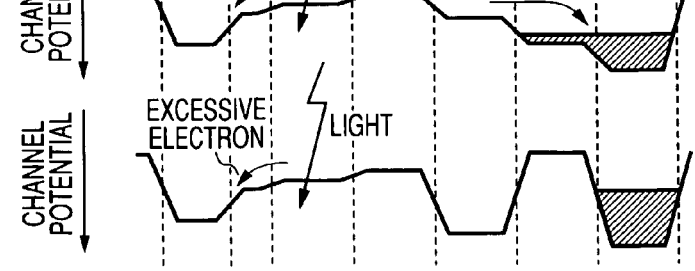

FIG. 11 is a timing chart illustrating a case where the operation according to the second driving mode and the operation according to the first driving mode are successively performed. The operations according to the respective driving modes are equal to the operations illustrated in FIGS. 9 and 4.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-091554, filed Mar. 31, 2008, which is hereby incorporated by reference herein its entirety.

The invention claimed is:

1. A driving method of a solid-state imaging apparatus, wherein the solid-state imaging apparatus includes a pixel portion with a plurality of pixels arranged in rows and columns, each of the pixels including:
   a photoelectric converting portion for photoelectrically converting an incident light;
   a first transferring portion for connecting the photoelectric converting portion to an accumulating portion for accumulating an electric charge;
   a second transferring portion for connecting the accumulating portion to a floating diffusion portion;
   a reset portion for connecting the floating diffusion portion to a first power source; and
   a third transferring portion for connecting the photoelectric converting portion to a second power source,
   such that, at least, during a time period of accumulating the electric charge in a pixel, a potential barrier formed in the first transferring portion for holding the electric charge accumulated in the accumulating portion is lower than a potential barrier formed in the third transferring portion,
   wherein the driving method comprises the steps of:
   setting, in a first driving mode, a start and an end of an operation of accumulating the electric charge in the pixel commonly to a plurality of rows of the pixels; and
   setting, in a second driving mode, a start and an end of an operation of accumulating the electric charge in the pixel commonly to pixels in each one of the rows of the pixels such that,
   setting in the first driving mode, during a time period of reading out a signal from the pixels in one of the rows, a potential barrier formed in the first transferring portion to be higher than a potential barrier formed in the third transferring portion for the plurality of rows of the pixels, while
   setting in the second driving mode, during a time period of reading out a signal from the pixels in one of the rows, the potential barrier formed in the first transferring portion to be lower than a potential of the photoelectric converting portion, and setting a potential barrier formed in the second transferring portion to be lower than a potential of the accumulating portion.

2. The driving method according to claim 1, further comprising the steps of:
   providing the first transferring portion, together with the photoelectric converting portion and the accumulating portion, to form a first transistor,
   providing the second transferring portion, together with the accumulating portion and the floating diffusion portion, to form a second transistor, and
   providing the third transferring portion, together with the photoelectric converting portion and the second power source, to form a third transistor, so as to control potential states of channels of the first, second and third transistors respectively.

3. The driving method according to claim 1, further comprising the step of:
   discharging, in the second driving mode, the electric charge generated photoelectrically in the photoelectric converting portion into the first power source through the first transferring portion, the second transferring portion and the reset portion.

4. The driving method according to claim 1, further comprising the steps of:
   synchronizing, in the second driving mode, lowering a potential barrier formed in the first and second transferring portions responsive to the electric charge accumulated in the accumulating portion, lowering a potential barrier formed in the third transferring portion for holding the electric charge accumulated in the accumulating portion, and driving the plurality of pixels row by row.

5. The driving method according to claim 1, further comprising the steps of performing an imaging of a still image in the first driving mode, and performing an imaging of a moving image in the second driving mode.

6. The driving method according to claim 1, wherein the first transferring portion comprises a buried channel type transistor.

7. The driving method according to claim 1, further comprising the step of setting, in the second driving mode, the potential barrier formed in the third transferring portion to be higher than the potential barrier formed in the first transferring portion.

8. An imaging system comprising:
   a solid-state imaging apparatus including a pixel portion with a plurality of pixels each including:
   a photoelectric converting portion for photoelectrically converting an incident light,
   a first transferring portion for connecting the photoelectric converting portion to an accumulating portion for accumulating an electric charge,
   a second transferring portion for connecting the accumulating portion to a floating diffusion portion,
   a reset portion for connecting the floating diffusion portion to a first power source, and
   a third transferring portion for connecting the photoelectric converting portion to a second power source,
   such that, at least, during a time period of accumulating the electric charge in a pixel, a potential barrier formed in the first transferring portion for holding the electric charge accumulated in the accumulating portion is lower than a potential barrier formed in the third transferring portion; and
   a controlling unit outputting a control signal for controlling the solid-state imaging apparatus to perform:
   a first driving mode wherein a start and an end of an operation of accumulating the electric charge in the pixel are set commonly to a plurality of rows of the pixels, and a second driving mode wherein a start and an end of an operation of accumulating the electric charge in the pixel are set commonly to pixels in each one of the rows of the pixels such that, in the first driving mode, during a time period of reading out a signal from the pixels in one of the rows, a potential barrier formed in the first transferring portion is higher than a potential barrier formed in the third transferring portion for the plurality of rows of the pixels, while in the second driving mode, during a time period of reading out a signal from the pixels in one of the rows, the potential barrier formed in the first transferring portion is lower than a potential of the photoelectric converting portion and a potential barrier formed in the second transferring portion is lower than a potential of the accumulating portion.

9. The imaging system according to claim 8, wherein the first transferring portion forms, together with the photoelectric converting portion and the accumulating portion, a first transistor, the second transferring portion forms, together with the accumulating portion and the floating diffusion portion, a second transistor, and the third transferring portion forms, together with the photoelectric converting portion and the second power source, a third transistor, so as to control potential states of channels of the first, second and third transistors respectively based on the control signal.

10. The imaging system according to claim 8, wherein, in the second driving mode, the electric charge generated photoelectrically in the photoelectric converting portion is discharged into the first power source through the first transferring portion, the second transferring portion and the reset portion.

11. The imaging system according to claim 8, wherein the control unit outputs the control signal such that, in the second driving mode, synchronized to lowering a potential barrier formed in the first and second transferring portions responsive to the electric charge accumulated in the accumulating portion, a potential barrier formed in the third transferring portion for holding the electric charge accumulated in the accumulating portion is lowered, and the plurality of pixels are driven row by row.

12. The imaging system according to claim 8, wherein the first transferring portion is a part of a buried channel type transistor.

13. The imaging system according to claim 8, wherein in the second driving mode, the potential barrier formed in the third transferring portion is higher than the potential barrier formed in the first transferring portion.

* * * * *